(12) United States Patent
Zhong et al.

(10) Patent No.: US 9,772,531 B2
(45) Date of Patent: Sep. 26, 2017

(54) COLOR LIQUID CRYSTAL DISPLAY PANEL

(71) Applicant: Shenzhen China Star Optoelectronics Technology Co., Ltd., Shenzhen, Guangdong (CN)

(72) Inventors: Xinhui Zhong, Guangdong (CN); Kuancheng Lee, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 645 days.

(21) Appl. No.: 14/236,701

(22) PCT Filed: Dec. 2, 2013

(86) PCT No.: PCT/CN2013/088359
§ 371 (c)(1),
(2) Date: Feb. 3, 2014

(87) PCT Pub. No.: WO2015/078026
PCT Pub. Date: Jun. 4, 2015

(65) Prior Publication Data
US 2016/0195754 A1    Jul. 7, 2016

(30) Foreign Application Priority Data

Nov. 28, 2013 (CN) .......................... 2013 1 0625551

(51) Int. Cl.
*G02F 1/1333* (2006.01)
*G02F 1/1347* (2006.01)
(Continued)

(52) U.S. Cl.
CPC ........ *G02F 1/13475* (2013.01); *G02F 1/1337* (2013.01); *G02F 1/1339* (2013.01);
(Continued)

(58) Field of Classification Search
CPC .................................................. G02F 1/13473
See application file for complete search history.

(56) References Cited

U.S. PATENT DOCUMENTS

| 5,712,695 A | 1/1998 | Tanaka et al. |
| 2003/0206260 A1* | 11/2003 | Kobayashi .......... G02F 1/13473 349/115 |

(Continued)

FOREIGN PATENT DOCUMENTS

| CN | 101501559 A | 8/2009 |
| CN | 101644845 A | 2/2010 |

(Continued)

*Primary Examiner* — Phu Vu
(74) *Attorney, Agent, or Firm* — Andrew C. Cheng

(57) ABSTRACT

The present invention provides a color liquid crystal display panel, which includes: a plurality of mutually parallel layers of liquid crystal cells (2) and bonding members (8) bonding the plurality of layers of liquid crystal cells (2). Each of the liquid crystal cells (2) includes a thin-film transistor substrate (20), a package substrate (30), and a dye-liquid crystal layer (40) sealed between the thin-film transistor substrate (20) and the package substrate (30). The dye-liquid crystal layer (40) includes a liquid crystal material and a dichroic dye. The dichroic dye of each of the liquid crystal cells (2) absorbs light of a predetermined range of wavelength. The plurality of layers of liquid crystal cells (2) respectively absorbs lights of different ranges of wavelength. The present invention includes a dichroic dye combined in a liquid crystal material in order to use the dichroic dye to absorb light of some colors thereby achieving color displaying without using a conventionally used polarizer and manufacture of a color filter substrate, so that the manufacture cost of and the requirement for backlighting brightness by the liquid crystal display panel can both be reduced.

13 Claims, 11 Drawing Sheets

(51) Int. Cl.
*G02F 1/1335* (2006.01)
*G02F 1/1337* (2006.01)
*G02F 1/1339* (2006.01)
*G02F 1/1343* (2006.01)
*G02F 1/1362* (2006.01)
*G02F 1/1368* (2006.01)

(52) U.S. Cl.
CPC ........ *G02F 1/1368* (2013.01); *G02F 1/13394* (2013.01); *G02F 1/13439* (2013.01); *G02F 1/133512* (2013.01); *G02F 1/136286* (2013.01); *G02F 2001/133302* (2013.01); *G02F 2001/133357* (2013.01); *G02F 2001/133742* (2013.01); *G02F 2202/28* (2013.01)

(56) References Cited

U.S. PATENT DOCUMENTS

2010/0045620 A1\* 2/2010 Long .................. G06F 3/044
                                                         345/173
2010/0128214 A1\* 5/2010 Lee .................. G02F 1/133788
                                                         349/130

FOREIGN PATENT DOCUMENTS

| CN | 202275248 U | 6/2012 |
| CN | 102549490 A | 7/2012 |
| CN | 102854650 A | 1/2013 |

\* cited by examiner

COLOR LIQUID CRYSTAL DISPLAY PANEL

BACKGROUND OF THE INVENTION

1. Field of the Invention

The present invention relates to the field of liquid crystal display technology, and in particular to a color liquid crystal display panel.

2. The Related Arts

Liquid crystal displays (LCDs) have a variety of advantages, such as thin device body, low power consumption, and being free of radiation, and are thus widely used. Most of the liquid crystal displays that are currently available in the market are backlighting liquid crystal displays, which comprise a liquid crystal display panel and a backlight module. The operation principle of the liquid crystal display panel is that, with liquid crystal molecules interposed between two parallel glass substrates, application of electricity is selectively carried out to control the liquid crystal molecules to change direction in order to refract out light emitting from the backlight module for generating images.

The liquid crystal display panel comprises a color filter (CF) substrate, a thin-film transistor (TFT) substrate, liquid crystal (LC) interposed between the CF substrate and the TFT substrate, and a sealant and the manufacturing process generally comprises: a front stage of array process (including thin film, yellow light, etching, and film stripping), an intermediate stage of cell process (including laminating the TFT substrate and the CF substrate), and a rear stage of assembling process (including mounting of drive ICs and printed circuit board). The front stage of array process generally forms the TFT substrate in order to control the movement of the liquid crystal molecules. The intermediate stage of cell process generally introduces the liquid crystal between the TFT substrate and the CF substrate. The rear stage of assembling process generally integrates the drive ICs and combining the printed circuit board to achieve driving of the liquid crystal molecules to rotate for displaying images.

The liquid crystal display panels that are available in the main stream market can be classified in three categories, including TN (twisted nematic)/STN (super twisted nematic), IPS (in-plane switching)/FFS (fringe field switching), and VA (Vertical Alignment), wherein the VA type liquid crystal display panel is one of the types of liquid crystal display panel that are of widest applications in the high-end liquid crystal display field and is a wide view angle liquid crystal display panel. Referring to FIG. 1, which is a schematic view showing the structure of a conventional VA type liquid crystal display panel, the conventional VA type liquid crystal display panel generally comprises, in a layer stacked arrangement from top to bottom, an upper polarizer 100, a CF substrate 110, a liquid crystal layer 120, a TFT substrate 130, and a lower polarizer 140, the layers being stacked, sequentially from top to bottom, to constitute a display panel.

To achieve full color displaying, a common practice is to form a CF substrate on a glass plate of a liquid crystal display panel (which is often a glass plate that is set opposite to the glass plate of the TFT substrate but can alternatively be the glass plate of the TFT substrate) through processes of coating, exposure, and development, so as to make use of the principle of spatial color mixture to fulfill full color displaying.

However, the CF substrate allows only lights of a portion of wavebands to pass therethrough and a polarizer must be included for polarization of the light. Consequently, the light intensity behind the CF substrate is reduced to only around 33% of the original level. This is one of the causes that make the optical efficiency of the conventional LCD relatively low. Further, since the manufacture of a CF substrate requires the inclusion of the polarizer and the application of a series of processes including coating, exposure, and development, it is adverse to control of the manufacture cost.

SUMMARY OF THE INVENTION

An object of the present invention is to provide a color liquid crystal display panel, which combines a dichroic dye in a liquid crystal material in order to uses the dichroic dye to absorb the lights of some colors for realization of full color displaying without including a conventionally used polarizer and manufacturing a color filter substrate, thereby lowering the manufacture cost of the liquid crystal display panel and requiring reduced backlighting brightness and thus enhancing transmittance and optical efficiency.

To achieve the above object, the present invention provides a color liquid crystal display panel, which comprises: a plurality of mutually parallel layers of liquid crystal cell and bonding members bonding the plurality of layers of liquid crystal cells. Each of the liquid crystal cells comprises a thin-film transistor substrate, a package substrate, and a dye-liquid crystal layer sealed between the thin-film transistor substrate and the package substrate. The dye-liquid crystal layer comprises a liquid crystal material and a dichroic dye. The dichroic dye of each of the liquid crystal cells absorbs a light of a predetermined range of wavelength. The plurality of layers of liquid crystal cells respectively absorbs lights of different ranges of wavelength.

The liquid crystal material is a negative dielectric anisotropic liquid crystal material and the bonding members are optically transparent glue or double-sided adhesive tapes.

The thin-film transistor substrate comprises a first transparent substrate, a plurality of gate lines formed on the first transparent substrate, a plurality of data lines formed on the first transparent substrate, an array of thin-film transistors formed on the first transparent substrate, a plurality of pixel electrodes formed on the array of thin-film transistors, a first planarization layer formed on the pixel electrodes and the array of thin-film transistors, and a first alignment layer formed on the first planarization layer.

The first transparent substrate is a glass substrate. The pixel electrodes are made of indium tin oxides. The first alignment layer is a vertical alignment layer.

The package substrate comprises a second transparent substrate, black matrixes formed on the second transparent substrate, a second planarization layer formed on the second transparent substrate and the black matrixes, common electrodes formed on the second planarization layer, a second alignment layer formed on the common electrodes, and a photo spacer layer formed on the second alignment layer. The black matrixes, the gate lines, the data lines, and the array of thin-film transistors collectively divide the color liquid crystal display panel into a plurality of pixels.

The second transparent substrate is a glass substrate. The common electrodes are made of indium tin oxides. The second alignment layer is a vertical alignment layer.

The liquid crystal material comprises liquid crystal molecules and the dichroic dye comprises dichroic dye molecules. The dichroic dye molecules have a molecular structure similar to a molecular structure of the liquid crystal molecules.

When no driving voltage is applied between the thin-film transistor substrate and the package substrate, the liquid crystal molecules and the dichroic dye molecules are both aligned in a direction substantially perpendicular to a surface of the thin-film transistor substrate and a surface of the package substrate, whereby the liquid crystal molecules and the dichroic dye molecules do not absorb light.

When a driving voltage is applied between the thin-film transistor substrate and the package substrate, the liquid crystal molecules and the dichroic dye molecules are both aligned at a predetermined angle with respect to a surface of the thin-film transistor substrate and a surface of the package substrate, the predetermined angle being greater than or equal to 0° and less than 90°, whereby the dichroic dye molecules selectively absorbs a portion of light.

The plurality of layers of liquid crystal cell comprises three layers, which are respectively first to third layers of liquid crystal cell. The first-layer liquid crystal cell comprises a dichroic dye that absorbs light in red light wavelength range. The second-layer liquid crystal cell comprises a dichroic dye that absorbs light in green light wavelength range. The third-layer liquid crystal cell comprises a dichroic dye that absorbs light in blue light wavelength range.

The present invention also provides a color liquid crystal display panel, which comprises: a plurality of mutually parallel layers of liquid crystal cell and bonding members bonding the plurality of layers of liquid crystal cells, each of the liquid crystal cells comprising a thin-film transistor substrate, a package substrate, and a dye-liquid crystal layer sealed between the thin-film transistor substrate and the package substrate, the dye-liquid crystal layer comprising a liquid crystal material and a dichroic dye, the dichroic dye of each of the liquid crystal cells absorbing a light of a predetermined range of wavelength, the plurality of layers of liquid crystal cells respectively absorbing lights of different ranges of wavelength;

wherein the liquid crystal material is a negative dielectric anisotropic liquid crystal material and the bonding members are optically transparent glue or double-sided adhesive tapes;

wherein the thin-film transistor substrate comprises a first transparent substrate, a plurality of gate lines formed on the first transparent substrate, a plurality of data lines formed on the first transparent substrate, an array of thin-film transistors formed on the first transparent substrate, a plurality of pixel electrodes formed on the array of thin-film transistors, a first planarization layer formed on the pixel electrodes and the array of thin-film transistors, and a first alignment layer formed on the first planarization layer;

wherein the first transparent substrate is a glass substrate; the pixel electrodes are made of indium tin oxides; and the first alignment layer is a vertical alignment layer;

wherein the package substrate comprises a second transparent substrate, black matrixes formed on the second transparent substrate, a second planarization layer formed on the second transparent substrate and the black matrixes, common electrodes formed on the second planarization layer, a second alignment layer formed on the common electrodes, and a photo spacer layer formed on the second alignment layer, the black matrixes, the gate lines, the data lines, and the array of thin-film transistors collectively dividing the color liquid crystal display panel into a plurality of pixels; and wherein the second transparent substrate is a glass substrate; the common electrodes are made of indium tin oxides; and the second alignment layer is a vertical alignment layer.

The liquid crystal material comprises liquid crystal molecules and the dichroic dye comprises dichroic dye molecules. The dichroic dye molecules have a molecular structure similar to a molecular structure of the liquid crystal molecules.

When no driving voltage is applied between the thin-film transistor substrate and the package substrate, the liquid crystal molecules and the dichroic dye molecules are both aligned in a direction substantially perpendicular to a surface of the thin-film transistor substrate and a surface of the package substrate, whereby the liquid crystal molecules and the dichroic dye molecules do not absorb light.

When a driving voltage is applied between the thin-film transistor substrate and the package substrate, the liquid crystal molecules and the dichroic dye molecules are both aligned at a predetermined angle with respect to a surface of the thin-film transistor substrate and a surface of the package substrate, the predetermined angle being greater than or equal to 0° and less than 90°, whereby the dichroic dye molecules selectively absorbs a portion of light.

The plurality of layers of liquid crystal cell comprises three layers, which are respectively first to third layers of liquid crystal cell, the first-layer liquid crystal cell comprising a dichroic dye that absorbs light in red light wavelength range, the second-layer liquid crystal cell comprising a dichroic dye that absorbs light in green light wavelength range, the third-layer liquid crystal cell comprising a dichroic dye that absorbs light in blue light wavelength range.

The efficacy of the present invention is that the present invention provides a color liquid crystal display panel, which comprises a dichroic dye having a specific absorption spectrum combined in a liquid crystal material to form a dye-liquid crystal layer that absorbs lights in a predetermined range of wavelength thereby achieving selective absorption of a light emitting from a backlight source and thus realizing displaying of a color. Further, through stacking a plurality of dye-liquid crystal layers that absorb lights in different ranges of wavelength, color displaying can be achieved, whereby color displaying is fulfilled without using a conventionally used polarizer and manufacture of a color filter substrate, so that the manufacture cost of and the requirement for backlighting brightness by the liquid crystal display panel can both be reduced and light transmittal and optic efficiency both enhanced.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

Figure 1:
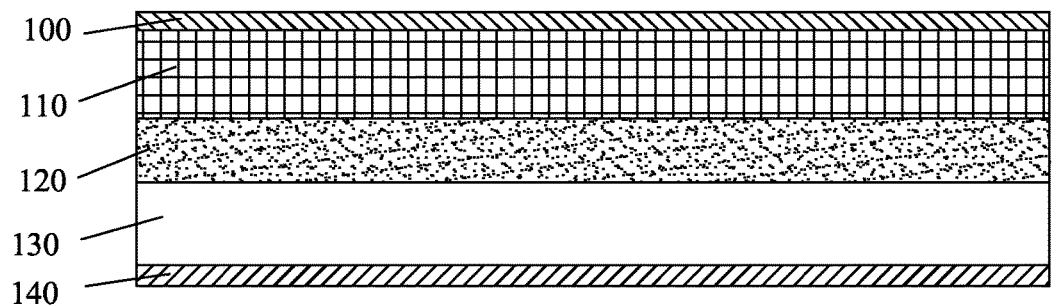
FIG. 1 is a schematic view showing the structure of a conventional color liquid crystal display panel.
Figure 2:
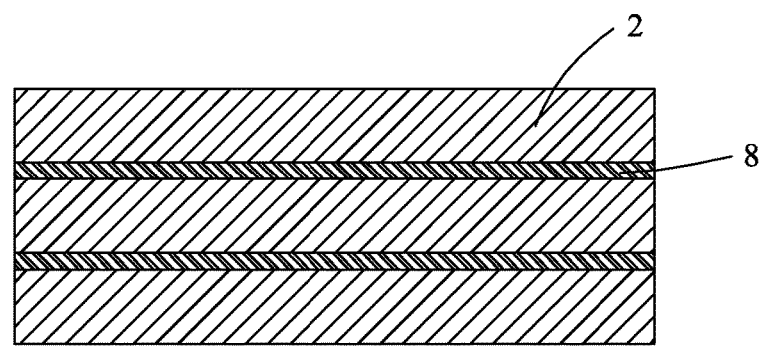
FIG. 2 is a schematic view showing the structure of a color liquid crystal display panel according to the present invention.

Referring to FIGS. 2-5, the present invention provides a color liquid crystal display panel, which comprises: a plurality of layers of liquid crystal cells 2 and bonding members 8 bonding the plurality of layers of liquid crystal cells 2. Each of the liquid crystal cells 2 comprises a thin-film transistor substrate 20, a package substrate 30, and a dye-liquid crystal layer 40 sealed between the thin-film transistor substrate 20 and the package substrate 30. The dye-liquid crystal layer 40 comprises a liquid crystal material and a dichroic dye. The dichroic dye of each of the liquid crystal cells 2 absorbs light of a predetermined range of wavelength. The plurality of layers of liquid crystal cells 2 respectively absorbs lights of different ranges of wavelength.

The liquid crystal material can be a negative dielectric anisotropic liquid crystal material and the dichroic dyes absorb lights of predetermined ranges of wavelength. The bonding members 8 can be optically transparent glue, a double-sided adhesive tape, or other transparent bonding members.

Figure 3:
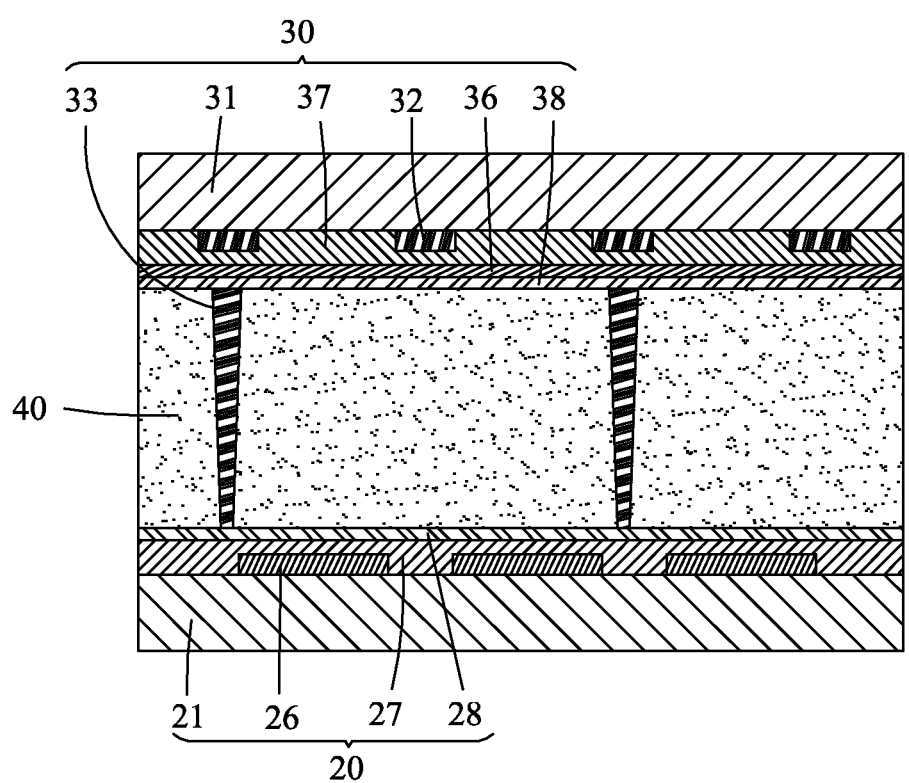
FIG. 3 is a schematic view showing the structure of a liquid crystal cell of FIG. 2.
Figure 4:
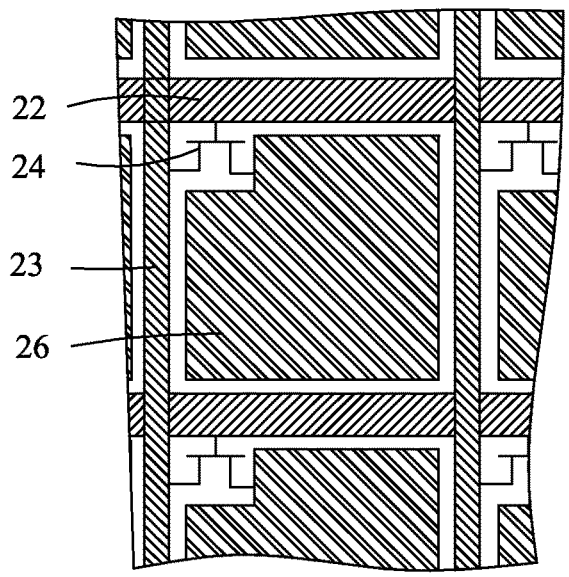
FIG. 4 is a top plan view of a thin-film transistor substrate of FIG. 3.

As shown in FIGS. 3 and 4, the thin-film transistor substrate 20 comprises a first transparent substrate 21, a plurality of gate lines 22 formed on the first transparent substrate 21, a plurality of data lines 23 formed on the first transparent substrate 21, an array of thin-film transistors 24 formed on the first transparent substrate 21, a plurality of pixel electrodes 26 formed on the array of thin-film transistors 24, a first planarization layer 27 formed on the pixel electrodes 26 and the array of thin-film transistors 24, and a first alignment layer 28 formed on the first planarization layer 27.

The first transparent substrate 21 can be a glass substrate or a plastic substrate and is preferably a glass substrate in the instant embodiment.

The thin-film transistors 24 each comprise a gate terminal, a source terminal, and a drain terminal. The gate terminals of the thin-film transistors 24 are electrically connected to the gate lines 22. The source terminals of the thin-film transistors 24 are electrically connected to the data lines 23. The drain terminals of the thin-film transistors 24 are electrically connected to the pixel electrodes 26. The pixel electrodes 26 are preferably made of indium tin oxides. The first alignment layer 28 can be a vertical alignment layer.

Figure 5:
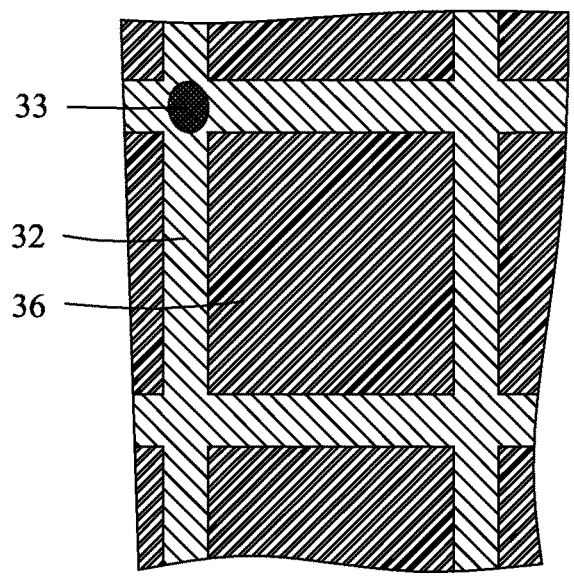
FIG. 5 is a top plan view of a package substrate of FIG. 3.

As shown in FIGS. 3 and 5, the package substrate 30 comprises a second transparent substrate 31, a plurality of black matrixes 32 formed on the second transparent substrate 31, a second planarization layer 37 formed on the second transparent substrate 31 and the black matrixes 32, common electrodes 36 formed on the second planarization layer 37, a second alignment layer 38 formed on the common electrodes 36, and a photo spacer layer 33 formed on the second alignment layer 38. The black matrixes 32, the gate lines 22, the data lines 23, and the array of thin-film transistors 24 collectively divide the color liquid crystal display panel into a plurality of pixels.

The second transparent substrate 31 can be a glass substrate or a plastic substrate and is preferably a glass substrate in the instant embodiment.

The black matrixes 32 function to shield light so as to make the light-shield portion black.

The common electrodes 36 are preferably made of indium tin oxides.

Figure 6:
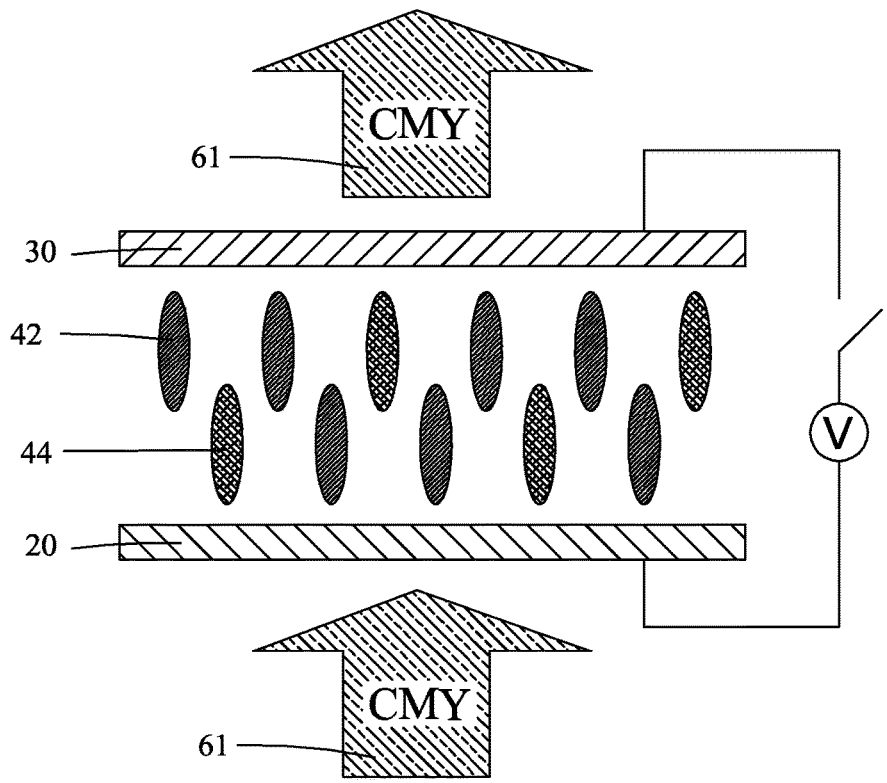
FIGS. 6-9 are schematic views illustrating the principle of displaying a single color with the color liquid crystal display panel according to the present invention.

As shown in FIGS. 3 and 6, the liquid crystal material comprises liquid crystal molecules 42 and the dichroic dye comprises dichroic dye molecules 44. The dichroic dye molecules 44 have a molecular structure similar to molecular structure of the liquid crystal molecules 42. The second alignment layer 38 is a vertical alignment layer. The second alignment layer 38 and the first alignment layer 28 makes the liquid crystal molecules 42 and the dichroic dye molecules 44 aligned in a direction perpendicular to the thin-film transistor substrate 20 or the package substrate 30 in an initial condition. In other words, even there is no driving voltage applied to the thin-film transistor substrate 20 and the package substrate 30, the liquid crystal molecules 42 and the dichroic dye molecules 44 are still aligned in a direction perpendicular to the thin-film transistor substrate 20 or the package substrate 30.

The photo spacer layer 33 functions to keep a predetermined distance between the thin-film transistor substrate 20 and the package substrate 30 in order to allow for uniform distribution of the molecules of the dye-liquid crystal layer 40 between the thin-film transistor substrate 20 and the package substrate 30 and prevent image blurring caused by non-uniform thickness of liquid crystal.

Referring to FIGS. 6-9, the principle of displaying a single color with the color liquid crystal display panel of the present invention is illustrated. The dye-liquid crystal layer 40 is formed by dissolving a predetermined amount of the dichroic dye in the liquid crystal material. The liquid crystal material comprises liquid crystal molecules 42 and the dichroic dye comprises dichroic dye molecules 44. The dichroic dye molecules 44 and the liquid crystal molecules 42 have similar molecular structure. The dichroic dye molecules 44 have the characteristics that when a traveling direction of a visible light is parallel to a major axis of the dichroic dye molecules 44, the dichroic dye molecules 44 generally does not absorb the visible light. When the traveling direction of the visible light is perpendicular to the major axis of the dichroic dye molecules 44, the dichroic dye molecules 44 shows strong absorption of the visible light. Thus, through controlling an included angle between the dichroic dye molecules 44 and a light emitting from a backlight source (not shown), it is possible to achieve an effect of adjusting transmitting light intensity by adjusting the absorbance of the dichroic dye molecules 44 with respect to the light from the backlight source, thereby realizing the purposes of displaying various grey levels.

Figure 7:
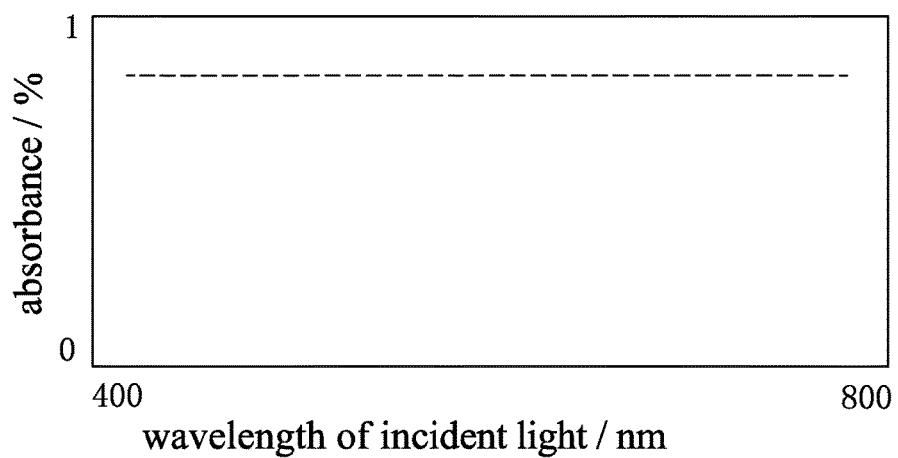

As shown in FIG. 6, when no driving voltage is applied to the thin-film transistor substrate 20 and the package substrate 30, the liquid crystal molecules 42 and the dichroic dye molecules 44 are both aligned in a direction perpendicular to the surface of the thin-film transistor substrate 20 or the surface of the package substrate 30. The liquid crystal molecules 42 generally absorbs no visible light and since a major axis of the dichroic dye molecules 44 is parallel to a traveling direction of the light emitting from the backlight source, the dichroic dye molecules 44 generally do not absorb the light 61 emitting from the backlight source. The absorption spectrum is shown in FIG. 7. This indicates that under a condition that no driving voltage is applied to the thin-film transistor substrate 20 and the package substrate 30, the light 61 emitting from the backlight source can mostly transmit through the liquid crystal display panel, so that the entire liquid crystal display panel shows a bright state.

Figure 8:
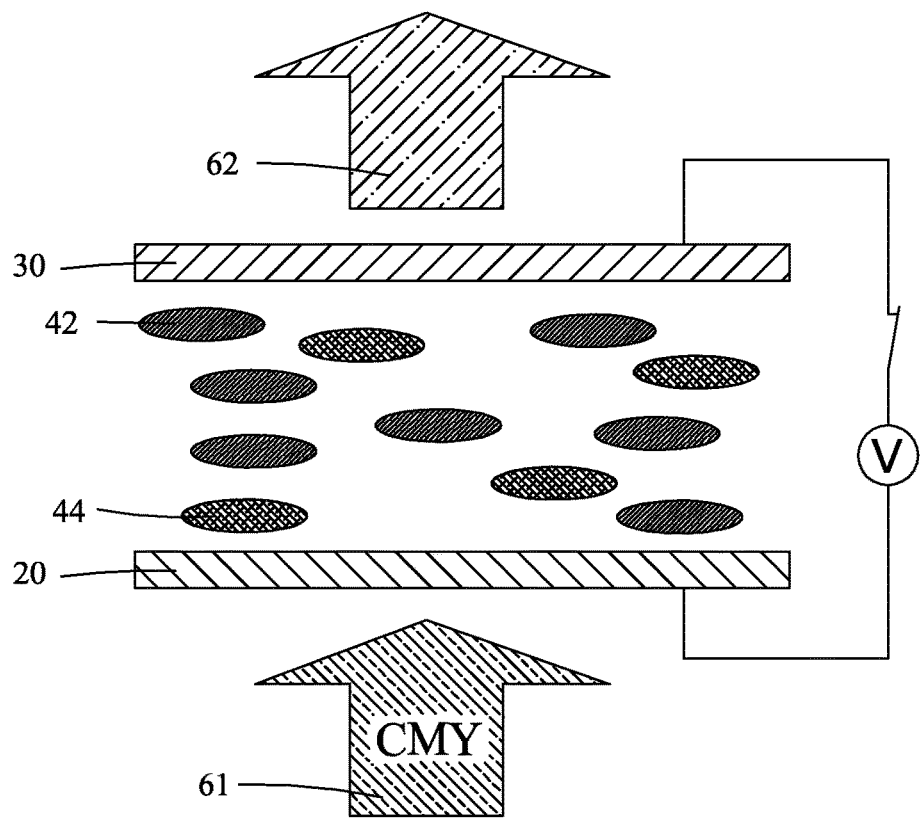
Figure 9:
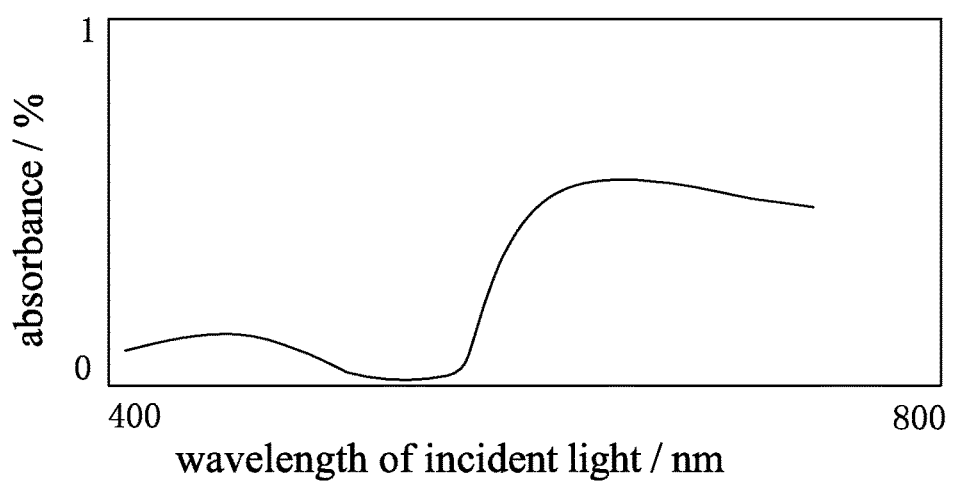

As shown in FIG. 8, when a driving voltage is applied to the thin-film transistor substrate 20 and the package substrate 30, due to the electrical field, the liquid crystal molecules 42 and the dichroic dye molecules 44 are both aligned in a direction at a predetermined angle with respect to the surface of the thin-film transistor substrate 20 or the surface of the package substrate 30, under such a condition, the dichroic dye molecules 44 absorbs a selected portion of the light. The predetermined angle is greater than or equal to 0° and less than 90°. Adjusting the level of the applied driving voltage allows for control of the included angle of the liquid crystal molecules 42 and the dichroic dye molecules 44 with respect to the surface of the thin-film transistor substrate 20 or the surface of the package substrate 30. When the included angle of the liquid crystal molecules 42 and the dichroic dye molecules 44 with respect to the surface of the thin-film transistor substrate 20 or the surface of the package substrate 30 is 0°, meaning under the electrical field, both the liquid crystal molecules 42 and the dichroic dye molecules 44 are inclined down and are aligned in a direction along the surface of the thin-film transistor substrate 20 or the surface of the package substrate 30, whereby the major axis of the dichroic dye molecules 44 is perpendicular to the traveling direction of the light 61 emitting from the backlight source and the dichroic dye molecules 44 strongly absorbs the light 61 emitting from the backlight source. The absorption spectrum is illustrated in FIG. 9. Since the dichroic dye has a specific absorption spectrum, the transmitting light 62 can be made in a specific color, realizing displaying of a color.

Referring to FIGS. 10-15, the principle of color displaying with the color liquid crystal display panel according to an embodiment of the present invention is illustrated. In the instant embodiment, the color liquid crystal display panel comprises three layers of liquid crystal cell, which are respectively first to third layers of liquid crystal cell 3, 4, 5. The first-layer liquid crystal cell 3 contains a dichroic dye that absorbs light in red light wavelength range. The second-layer liquid crystal cell 4 contains a dichroic dye that absorbs light in green light wavelength range. The third-layer liquid crystal cell 5 contains a dichroic dye that absorbs light in blue light wavelength range.

Figure 10:
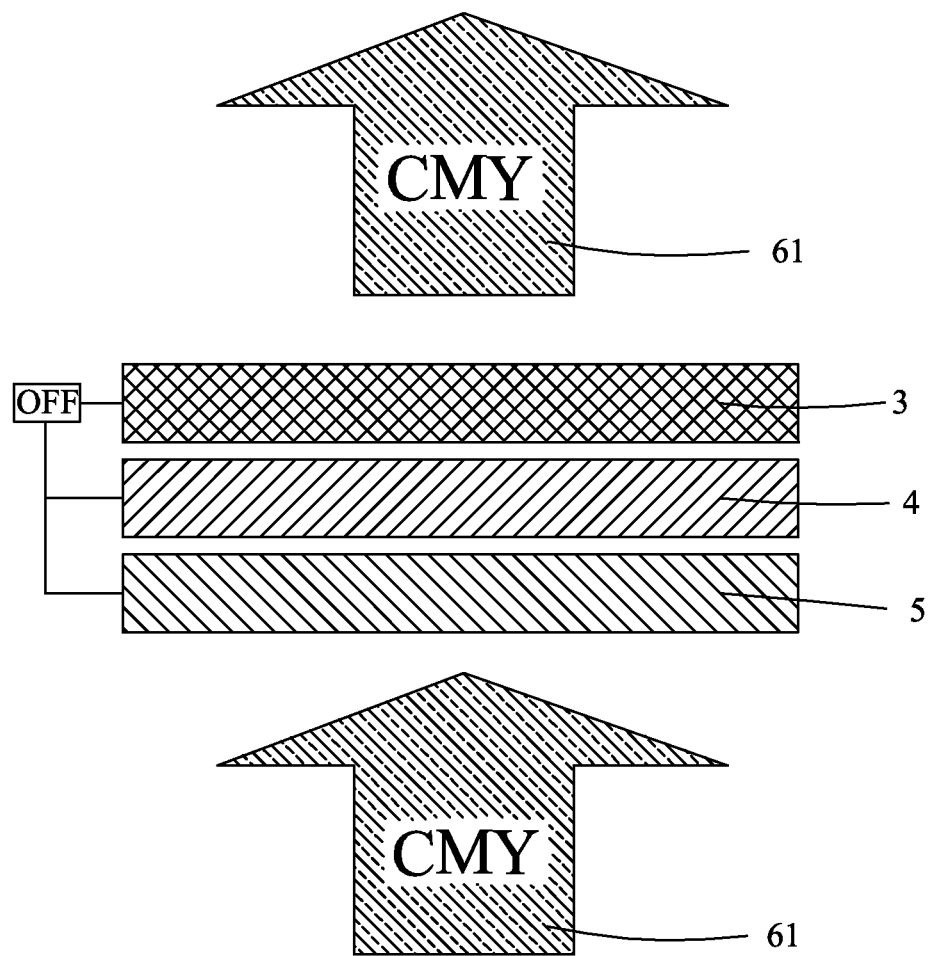
FIGS. 10-14 are schematic views illustrating the principle of color displaying according to a preferred embodiment of the color liquid crystal display panel according to the present invention.

As shown in FIG. 10, when no driving voltage is applied between two substrates of any one of the first-layer liquid crystal cell 3, the second-layer liquid crystal cell 4, and the third-layer liquid crystal cell 5, meaning the liquid crystal cells of the three layers being all set in an OFF state, the light 61 emitting from the backlight source is generally not absorbed and thus the light 61 emitting from the backlight source mostly transmits through the liquid crystal display panel, making the entire liquid crystal display panel in a bright state.

Figure 11:
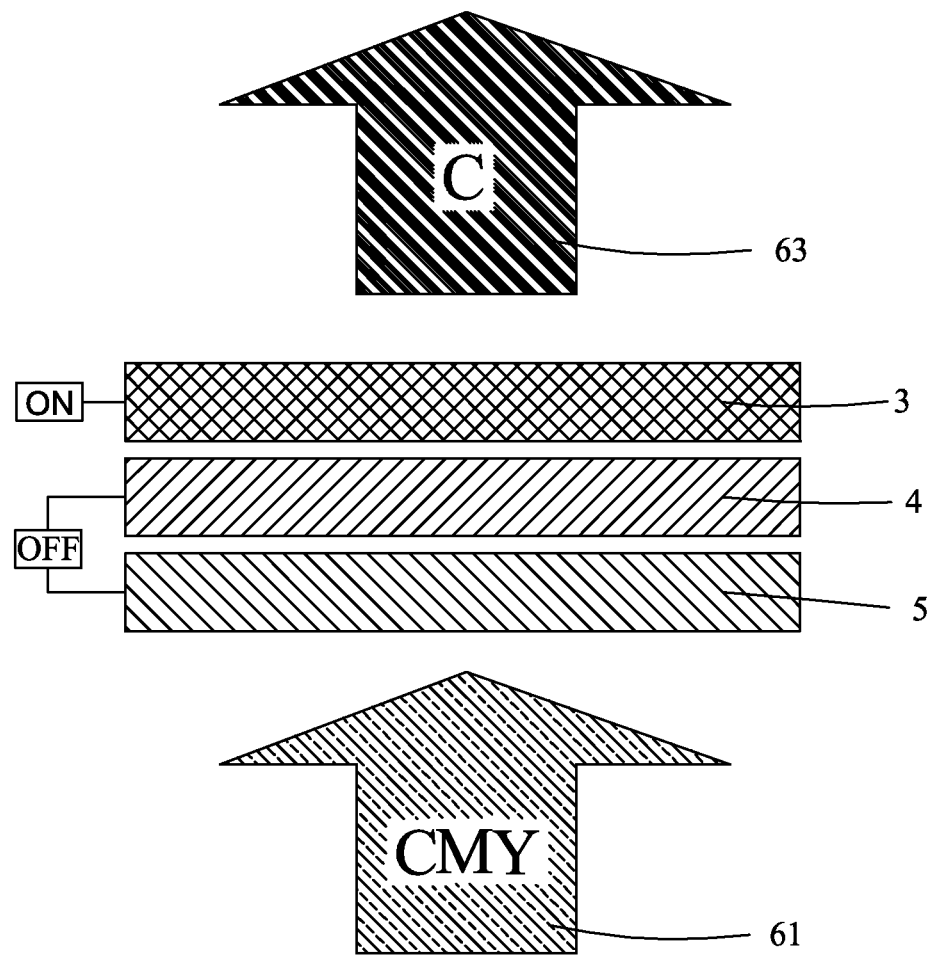

As shown in FIG. 11, when a driving voltage is applied only between the two substrates of the first-layer liquid crystal cell 3, meaning only the first-layer liquid crystal cell 3 being set in an ON state, only the red light is absorbed and lights or other colors are allowed to transmit through the liquid crystal display panel, whereby the transmitting lights are mixed with each other to form a cyan light 63. Thus, when there is only the first-layer liquid crystal cell 3 is in the ON state, the liquid crystal display panel displays a cyan color.

Figure 12:
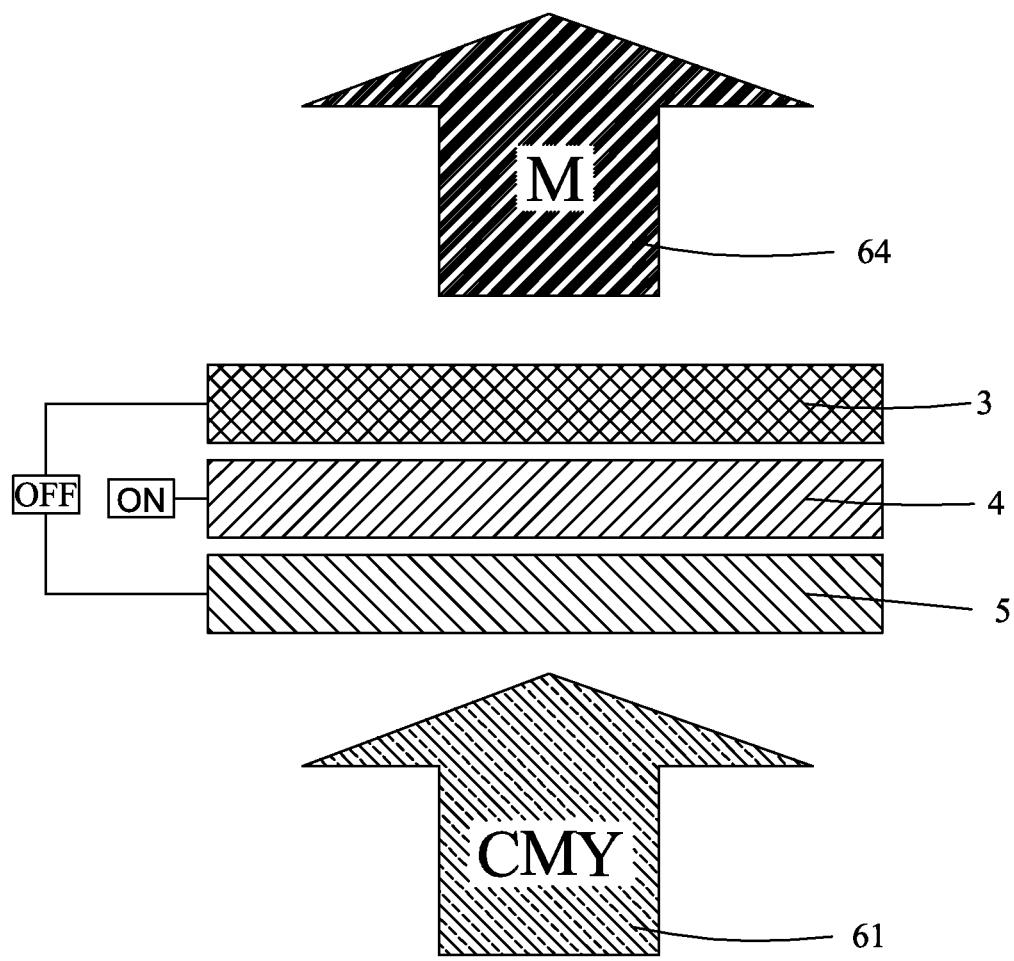

As shown in FIG. 12, when a driving voltage is applied only between the two substrates of the second-layer liquid crystal cell 4, meaning only the second-layer liquid crystal cell 4 being set in an ON state, only the green light is absorbed and lights or other colors are allowed to transmit through the liquid crystal display panel, whereby the transmitting lights are mixed with each other to form a magenta light 64. Thus, when there is only the second-layer liquid crystal cell 4 is in the ON state, the liquid crystal display panel displays a magenta color.

Figure 13:
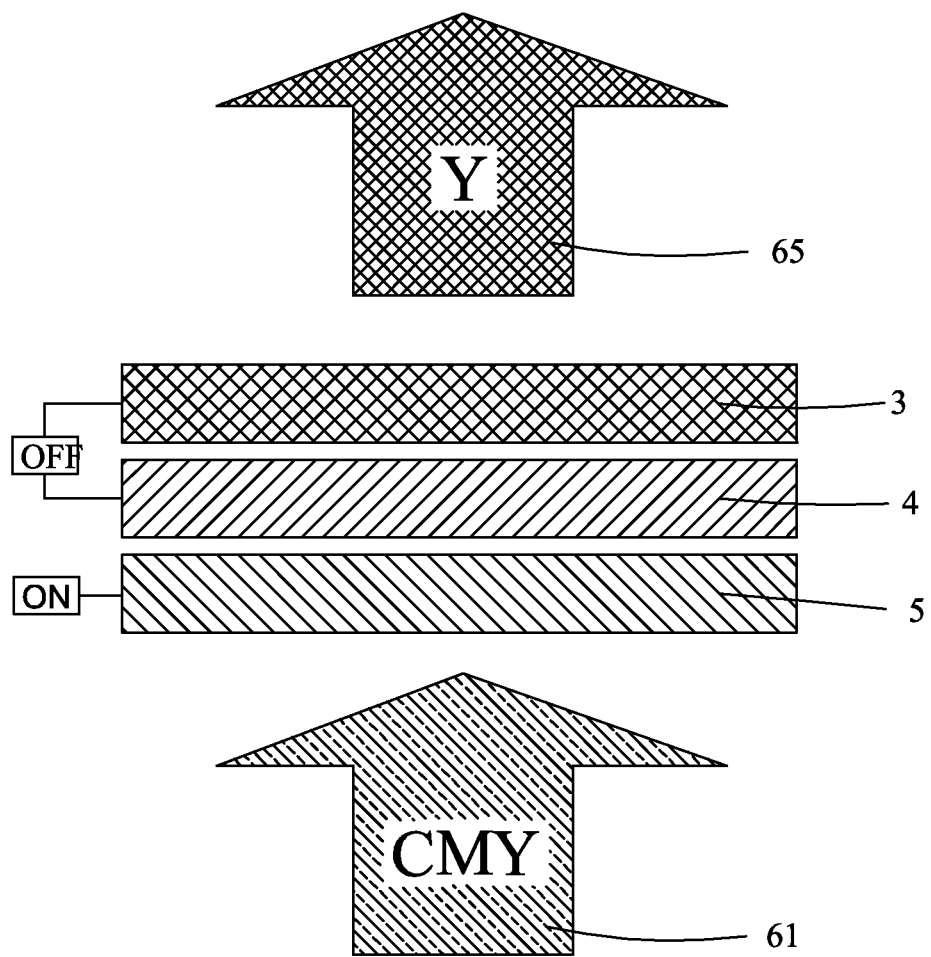

As shown in FIG. 13, when a driving voltage is applied only between the two substrates of the third-layer liquid crystal cell 5, meaning only the third-layer liquid crystal cell 5 being set in an ON state, only the blue light is absorbed and lights or other colors are allowed to transmit through the liquid crystal display panel, whereby the transmitting lights are mixed with each other to form a yellow light 65. Thus, when there is only the third-layer liquid crystal cell 5 is in the ON state, the liquid crystal display panel displays a yellow color.

Figure 14:
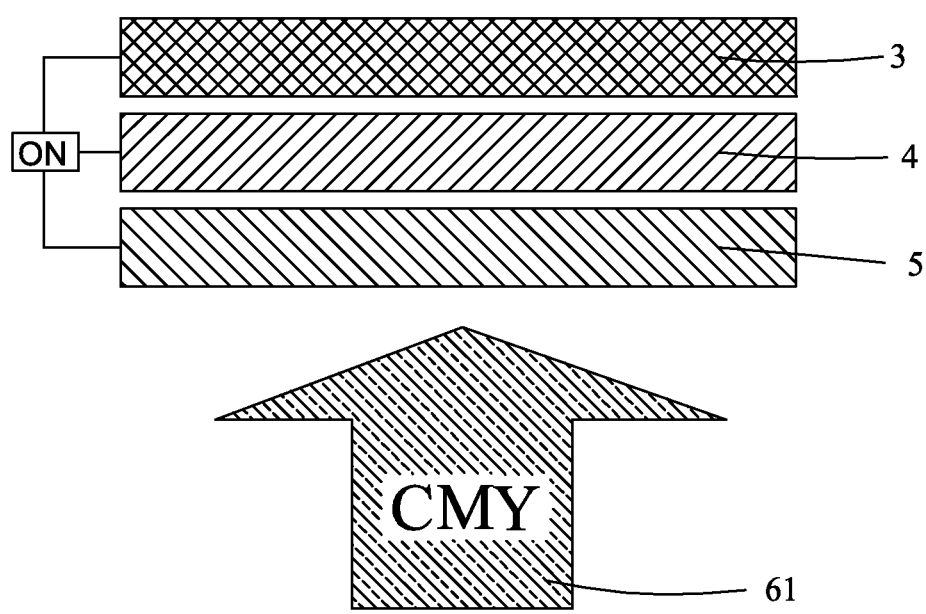

As shown in FIG. 14, when a driving voltage is applied between the two substrates of the liquid crystal cell of each of the three layers, meaning the liquid crystal cells of the three layers being all set in an ON state, the red light, the green light, and the blue light are all absorbed. Since the dichroic dyes of the liquid crystal cells of the layers have different absorption spectra, superimposing the absorption spectra of the three dichroic dyes substantially covers the entire visible waveband so that the light 61 emitting from the backlight source is mostly absorbed, making the entire liquid crystal display panel in a dark state.

Figure 15:
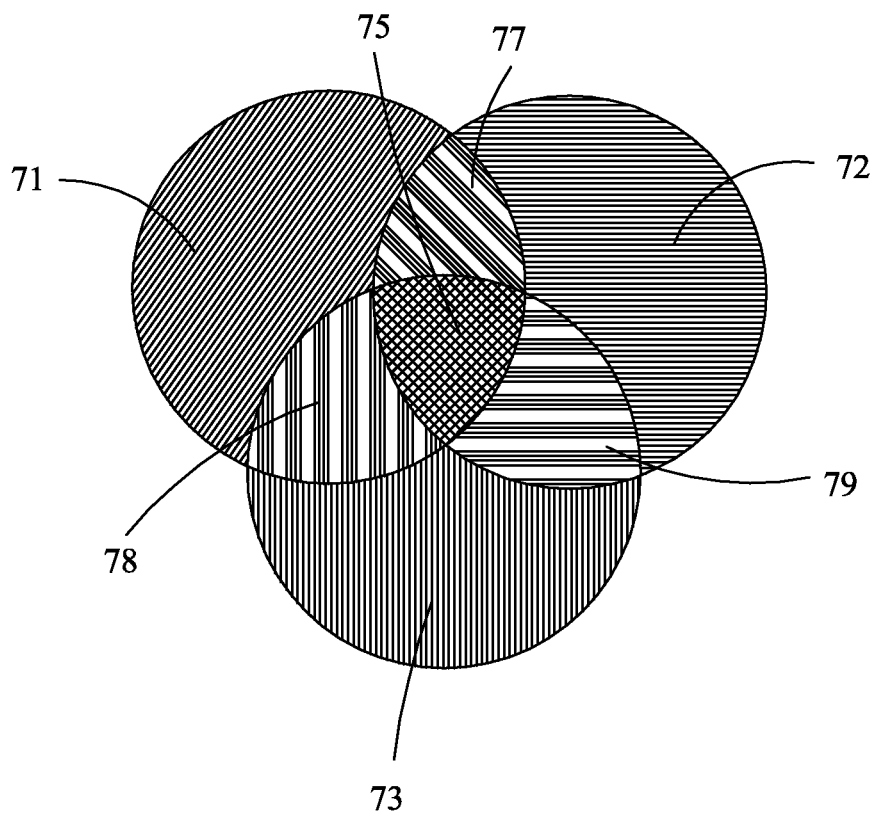
FIG. 15 is a schematic view illustrating the principle of color subtraction.

Except the displaying of the above-mentioned colors, the liquid crystal display panel according to the present invention may use color subtraction principle to achieve the displaying of more colors thereby fulfilling color displaying. The principle of color subtraction is illustrated in FIG. 15, where mixture of cyan 71 and magenta 72 gives red 77; mixture of cyan 71 and yellow 73 gives green 78; mixture of magenta 72 and yellow 73 gives blue 79; and mixture of the three colors of cyan 71, magenta 72, and yellow 73 gives black 75. Thus, in the instant embodiment, selective application of a driving voltage can be made between the two substrates of the first-layer liquid crystal cell 3, the second-layer liquid crystal cell 4, and the third-layer liquid crystal cell 5 to generate a light of the mixture of two or more than two colors, thereby achieving color displaying with the liquid crystal display panel.

In summary, the present invention provides a color liquid crystal display panel, which comprises a dichroic dye having a specific absorption spectrum combined in a liquid crystal material to form a dye-liquid crystal layer that absorbs lights in a predetermined range of wavelength thereby achieving selective absorption of a light emitting from a backlight source and thus realizing displaying of a color. Further, through stacking a plurality of dye-liquid crystal layers that absorb lights in different ranges of wavelength, color displaying can be achieved, whereby color displaying is fulfilled without using a conventionally used polarizer and manufacture of a color filter substrate, so that the manufacture cost of and the requirement for backlighting brightness by the liquid crystal display panel can both be reduced and light transmittal and optic efficiency both enhanced.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A color liquid crystal display panel, comprising: a plurality of mutually parallel layers of liquid crystal cell and bonding members bonding the plurality of layers of liquid crystal cells, each of the liquid crystal cells comprising a thin-film transistor substrate, a package substrate, and a dye-liquid crystal layer sealed between the thin-film transistor substrate and the package substrate, the dye-liquid crystal layer comprising a liquid crystal material and a dichroic dye, the dichroic dye of each of the liquid crystal cells absorbing a light of a predetermined range of wavelength, the plurality of layers of liquid crystal cells respectively absorbing lights of different ranges of wavelength;

wherein for each of the layers of liquid crystal cells, the liquid crystal material comprises liquid crystal molecules and the dichroic dye comprises dichroic dye molecules, the dichroic dye molecules having a molecular structure that is similar to a molecular structure of the liquid crystal molecules and shows absorption of visible light in a condition that a major axis of the dichroic dye molecules is substantially perpendicular to a traveling direction of the visible light, such that the liquid crystal molecules and the dichroic dye molecules are movable in unison with each other between a first state where the major axis of the dichroic dye molecules is substantially parallel to the traveling direction of the light of the predetermined range of wavelength and both the liquid crystal molecules and the dichroic dye molecules allow the light of the predetermined range of wavelength to transmit therethrough and a second state where the major axis of the dichroic dye molecules is substantially perpendicular to the traveling direction of the light of the predetermined range of wavelength and the dichroic dye molecules absorbs the predetermined range of wavelength, wherein the dichroic dye molecules selectively block the transmission of the light of the predetermined range of wavelength by absorbing the light of the predetermined range of wavelength.

2. The color liquid crystal display panel as claimed in claim 1, wherein the liquid crystal material is a negative dielectric anisotropic liquid crystal material and the bonding members are optically transparent glue or double-sided adhesive tapes.

3. The color liquid crystal display panel as claimed in claim 1, wherein the thin-film transistor substrate comprises a first transparent substrate, a plurality of gate lines formed on the first transparent substrate, a plurality of data lines formed on the first transparent substrate, an array of thin-film transistors formed on the first transparent substrate, a plurality of pixel electrodes formed on the array of thin-film transistors, a first planarization layer formed on the pixel electrodes and the array of thin-film transistors, and a first alignment layer formed on the first planarization layer.

4. The color liquid crystal display panel as claimed in claim 3, wherein the first transparent substrate is a glass substrate; the pixel electrodes are made of indium tin oxides; and the first alignment layer is a vertical alignment layer.

5. The color liquid crystal display panel as claimed in claim 3, wherein the package substrate comprises a second transparent substrate, black matrixes formed on the second transparent substrate, a second planarization layer formed on the second transparent substrate and the black matrixes, common electrodes formed on the second planarization layer, a second alignment layer formed on the common electrodes, and a photo spacer layer formed on the second alignment layer, the black matrixes, the gate lines, the data lines, and the array of thin-film transistors collectively dividing the color liquid crystal display panel into a plurality of pixels.

6. The color liquid crystal display panel as claimed in claim 5, wherein the second transparent substrate is a glass substrate; the common electrodes are made of indium tin oxides; and the second alignment layer is a vertical alignment layer.

7. The color liquid crystal display panel as claimed in claim 1, wherein when no driving voltage is applied between the thin-film transistor substrate and the package substrate, the liquid crystal molecules and the dichroic dye molecules are in the first state, where both the liquid crystal molecules and the dichroic dye molecules are aligned in a direction substantially perpendicular to a surface of the thin-film transistor substrate and a surface of the package substrate, whereby the liquid crystal molecules and the dichroic dye molecules do not absorb the light of the predetermined range of wavelength and thus allow the light of the predetermined range of wavelength to transmit therethrough.

8. The color liquid crystal display panel as claimed in claim 1, wherein when a driving voltage is applied between the thin-film transistor substrate and the package substrate, the liquid crystal molecules and the dichroic dye molecules are in the second state, where both the liquid crystal molecules and the dichroic dye molecules are aligned at a predetermined angle with respect to a surface of the thin-film transistor substrate and a surface of the package substrate, the predetermined angle being greater than or equal to 0° and less than 90°, whereby the dichroic dye molecules selectively absorbs a portion of the light of the predetermined range of wavelength.

9. The color liquid crystal display panel as claimed in claim 1, wherein the plurality of layers of liquid crystal cell comprises three layers, which are respectively first to third layers of liquid crystal cell, the first-layer liquid crystal cell comprising a dichroic dye that absorbs light in red light wavelength range, the second-layer liquid crystal cell comprising a dichroic dye that absorbs light in green light wavelength range, the third-layer liquid crystal cell comprising a dichroic dye that absorbs light in blue light wavelength range.

10. A color liquid crystal display panel, comprising: a plurality of mutually parallel layers of liquid crystal cell and bonding members bonding the plurality of layers of liquid crystal cells, each of the liquid crystal cells comprising a thin-film transistor substrate, a package substrate, and a dye-liquid crystal layer sealed between the thin-film transistor substrate and the package substrate, the dye-liquid crystal layer comprising a liquid crystal material and a dichroic dye, the dichroic dye of each of the liquid crystal cells absorbing a light of a predetermined range of wavelength, the plurality of layers of liquid crystal cells respectively absorbing lights of different ranges of wavelength;

wherein the liquid crystal material is a negative dielectric anisotropic liquid crystal material and the bonding members are optically transparent glue or double-sided adhesive tapes;

wherein the thin-film transistor substrate comprises a first transparent substrate, a plurality of gate lines formed on the first transparent substrate, a plurality of data lines formed on the first transparent substrate, an array of thin-film transistors formed on the first transparent substrate, a plurality of pixel electrodes formed on the array of thin-film transistors, a first planarization layer formed on the pixel electrodes and the array of thin-film transistors, and a first alignment layer formed on the first planarization layer;

wherein the first transparent substrate is a glass substrate; the pixel electrodes are made of indium tin oxides; and the first alignment layer is a vertical alignment layer;

wherein the package substrate comprises a second transparent substrate, black matrixes formed on the second transparent substrate, a second planarization layer formed on the second transparent substrate and the black matrixes, common electrodes formed on the second planarization layer, a second alignment layer formed on the common electrodes, and a photo spacer layer formed on the second alignment layer, the black matrixes, the gate lines, the data lines, and the array of thin-film transistors collectively dividing the color liquid crystal display panel into a plurality of pixels;

wherein the second transparent substrate is a glass substrate; the common electrodes are made of indium tin oxides; and the second alignment layer is a vertical alignment layer; and wherein for each of the layers of liquid crystal cells, the liquid crystal material comprises liquid crystal molecules and the dichroic dye comprises dichroic dye molecules, the dichroic dye molecules having a molecular structure that is similar to a molecular structure of the liquid crystal molecules and shows absorption of visible light in a condition that a major axis of the dichroic dye molecules is substantially perpendicular to a traveling direction of the visible light, such that the liquid crystal molecules and the dichroic dye molecules are movable in unison with each other between a first state where the major axis of the dichroic dye molecules is substantially parallel to the traveling direction of the light of the predetermined range of wavelength and both the liquid crystal molecules and the dichroic dye molecules allow the light of the predetermined range of wavelength to transmit therethrough and a second state where the major axis of the dichroic dye molecules is substantially perpendicular to the traveling direction of the light of the predetermined range of wavelength and the dichroic dye molecules absorbs the predetermined range of wavelength, wherein the dichroic dye molecules selectively block the transmission of the light of the predetermined range of wavelength by absorbing the light of the predetermined range of wavelength.

11. The color liquid crystal display panel as claimed in claim 10, wherein when no driving voltage is applied between the thin-film transistor substrate and the package substrate, the liquid crystal molecules and the dichroic dye molecules are in the first state, where both the liquid crystal molecules and the dichroic dye molecules are aligned in a direction substantially perpendicular to a surface of the thin-film transistor substrate and a surface of the package substrate, whereby the liquid crystal molecules and the dichroic dye molecules do not absorb the light of the predetermined range of wavelength and thus allow the light of the predetermined range of wavelength to transmit therethrough.

12. The color liquid crystal display panel as claimed in claim 10, wherein when a driving voltage is applied between the thin-film transistor substrate and the package substrate, the liquid crystal molecules and the dichroic dye molecules are in the second state, where both the liquid crystal molecules and the dichroic dye molecules are aligned at a predetermined angle with respect to a surface of the thin-film transistor substrate and a surface of the package substrate, the predetermined angle being greater than or equal to 0° and less than 90°, whereby the dichroic dye molecules selectively absorbs a portion of the light of the predetermined range of wavelength.

13. The color liquid crystal display panel as claimed in claim 10, wherein the plurality of layers of liquid crystal cell comprises three layers, which are respectively first to third layers of liquid crystal cell, the first-layer liquid crystal cell comprising a dichroic dye that absorbs light in red light wavelength range, the second-layer liquid crystal cell comprising a dichroic dye that absorbs light in green light wavelength range, the third-layer liquid crystal cell comprising a dichroic dye that absorbs light in blue light wavelength range.

* * * * *